3,206,427
VINYLIDENE CHLORIDE POLYMER COMPOSITIONS HAVING IMPROVED LOW TEMPERATURE PROPERTIES
George J. Butzler, Midland, and William D. Shelburg, Bay City, Mich., and George B. Sterling, Mogadore, Ohio, assignors to The Dow Chemical Company, Midland, Mich., a corporation of Delaware
No Drawing. Filed Apr. 18, 1963, Ser. No. 273,809
15 Claims. (Cl. 260—31.8)

This invention relates to polymeric compositions and, in particular, to polymeric compositions based on vinylidene chloride polymers and copolymers.

Polymers and copolymers of vinylidene chloride with such comonomers as acrylonitrile, vinyl chloride, and lower alkyl acrylates have found wide use as films for packaging of foodstuffs and other articles. Such films possess many useful properties, such as inertness, ability to be heat-sealed, transparency, shrinkability, and low water vapor transmission rates, which are desirable for packaging foodstuffs. However, prior vinylidene chloride polymer films suffered the disadvantage of becoming brittle and losing strength and other qualities at low temperatures. Prior art attempts to plasticize these copolymers have not generally been successful in overcoming those problems. The compatibility of liquid plasticizers with vinylidene chloride polymers is restricted which limits low temperature flexibility. Such liquid plasticizers also have a tendency to bleed out of the composition which is undersirable for packing of certain foods.

Accordingly, it is a principal object of this invention to provide polymeric compositions based on polymers of vinylidene chloride which compositions retain their flexibility and other properties at low temperatures, such as are encountered in refrigerated food-stuffs and frozen foodstuffs.

It is a further object of this invention to provide polymeric compositions which are relatively impermeable to water vapor and other gases.

Other and related objects will become evident from the following specification and claims.

The polymeric compositions of this invention comprise a blend of (I) from about 70 to 95 percent by weight of the composition of a normally crystalline polymer consisting of (a) from 70 to 100 percent by weight of vinylidene chloride and (b) 0 to 30 percent by weight of at least one monoethylenically unsaturated comonomer and (II) complementarily from about 5 to 30 percent by weight of the composition of a rubbery interpolymer consisting of (1) from about 70 to 95 percent by weight of at least one alkyl ester of acrylic acid containing from 4 to 8 carbon atoms in the alkyl constituent and (2) from about 5 to 30 percent by weight of at least one monomer selected from the group consisting of a lower alkyl-lower alkenyl ketone, and a lower alkyl alkacrylate.

The normally crystalline vinylidene chloride polymers usable in this invention are well known and may be prepared by interpolymerizing vinylidene chloride with known comonomers. Typical of the normally crystalline polymeric materials falling within the advantageous definition are the polymers and copolymers of at least 70 percent by weight of vinylidene chloride with the remainder composed of one or more other monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloropropene. Known ternary compositions also may be employed advantageously. Representative of such polymers are those composed of at least 70 percent by weight of vinylidene chloride with the remainder made up of, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate, or vinyl chloride, allyl esters or ethers and vinyl chloride, butadiene and vinyl acetate, vinyl propionate, or vinyl chloride and vinyl ethers and vinyl chloride. Quaternary polymers of similar monomeric composition will also be known.

The rubbery interpolymers which impart low temperature flexibility to the vinylidene chloride polymer are interpolymers of the herein prescribed amounts of (1) alkyl esters of acrylic acid having 4 to 8 carbon atoms in the alkyl constituent, such as butyl acrylate, 2-ethylhexyl acrylate, and the like, (2) lower alkyl-lower alkenyl ketones, such as methyl isopropenyl ketone, ethyl vinyl ketone, and methyl vinyl ketone, and the like, and (3) lower alkyl alkacrylates, exemplary of which are methyl methacrylate, isopropyl methacrylate, butyl methacrylate, methyl ethacrylate, ethyl ethacrylate, and propyl ethacrylate.

The contemplated interpolymers are rubber-like elastomers advantageously having a Mooney viscosity at 212° F. of between about 1 and 50, and preferably in the range of between about 5 and 15, and may be prepared by procedures well known in the art, as for example, by copolymerizing the monomers in aqueous emulsion by the procedures as generally disclosed in U.S. Patent No. 2,462,354, issued February 22, 1949.

The polymer blends of the invention may include plasticizers, such as dioctyl phthalate, dibutyl sebacate, and the like, in the range of about 2 to 10 percent by weight of the composition. The polymer blends may also include antioxidants, light stabilizers, and other additives known in the art which do not deleteriously affect the properties of the film.

The polymer blends of the invention are preferably prepared by mixing latexes of the vinylidene chloride polymers and of the rubber-like interpolymer in the proper proportions, coagulating the latex blend with alum or other known coagulants, and recovering the dried polymer. The polymer blends are preferably extruded in tube form, stretched and oriented by the bubble technique and slit to form films as is known in this art. The compositions are useful in other processes, such as molding, slot extrusion, and other thermal fabrication techniques, to form films, fibers, foils, molded articles, and other forms having the superior properties.

The products of this invention will be illustrated with the following example in which all percentages and parts are by weight.

EXAMPLE

A latex containing about 34 percent solids of a copolymer composed of 73 percent by weight vinylidene chloride and 27 percent by weight of vinyl chloride was prepared by emulsion polymerization, utilizing a mixture of potassium persulfate and sodium bisulfite as the catalyst, and an alkyl benzene sodium sulfonate available commercially as "Ultrawet DS" as the emulsifier, in a manner well known in the art.

Several batches of rubbery latexes were prepared composed of varying amounts of an alkyl ester of acrylic acid as described herein, methyl isopropenyl ketone, and methyl methacrylate to form latexes having between about 5 and 40 percent solids content, utilizing potassium persulfate as the catalyst and sodium lauryl sulfonate as the emulsifier, such polymerization being conducted at a temperature of between 60 and 65° C.

Separate polymer blends composed of (I) from 92.5 to 85 percent by weight of the vinylidene chloride-vinyl chloride copolymer as described herein, and (II) from 7.5 to 15 percent by weight of the rubbery interpolymer described herein were formed by individually blending such polymeric latexes in the desired proportions, and subsequently coagulating and drying the same. To each polymer blend was then individually added 7 percent by weight based on the total weight of the blend of the plasticizer, dibutyl sebacate, and 1 percent by weight of an ester of an epoxidized fatty acid, available commercially as "Paraplex G–60."

Individual samples of the polymer blend were thermally extruded using standard bubble techniques into oriented films having a thickness of 0.001 inch. The following films were prepared by the procedures as described herein, for purposes of comparison: an unmodified vinylidene chloride copolymer containing 7 percent dibutyl sebacate and 1 percent "Paraplex G–60"; a film composed of vinylidene chloride copolymer containing 15 percent by weight butyl acrylate, plus the indicated amounts of dibutyl sebacate and "Paraplex G–60"; a film composed of vinylidene chloride copolymer containing 12 percent by weight of a mixture of (1) 80 percent by weight butyl methacrylate and (2) 20 percent by weight methyl methacrylate; and a film composed of vinylidene chloride copolymer containing 12 percent by weight of a mixture of (1) 80 percent by weight butyl acrylate and (2) 20 percent by weight ethyl acrylate.

The following table illustrates the composition of the rubber latex, and the results of the physical properties determined on the above-described oriented films. The column headings of such table have the following meanings:

Clarity—Visual rating of the oriented film
Cold Flex—Number of hand flexes at −18° C. (0° F.) to produce rupture Tensile strengths, both longitudinal and transverse, and percent elongation, for each of the oriented films were also determined by conventional procedures utilizing a Scott IP–4 Tester. Oxygen transmission data were also obtained as cc. at STP/100 in.$^2$/24 hrs./mil at 1 atmosphere driving force.

oxygen transmission, tensile strength and elongation of oriented films prepared from all of the herein described compositions, are within the range desirable for commercially acceptable vinylidene chloride polymer films.

Similar good results are obtained from any composition comprising (I) from about 70 to 95 percent by weight of the composition of a normally crystalline polymer consisting of (a) about 70 to 100 percent by weight of vinylidene chloride and (b) 0 to 30 percent by weight of at least one monoethylenically unsaturated comonomer and (II) from aobut 5 to 30 percent by weight of the composition of a rubbery interpolymer as described herein.

We claim:

1. A polymeric composition comprising a blend of (I) from about 70 to 95 percent by weight of the composition of a normally crystalline polymer selected from the group consisting of polyvinylidene chloride and interpolymers of at least about 70 percent by weight of vinylidene chloride with up to about 30 percent by weight of at least one other monoethylenically unsaturated comonomer and (II) complementarily from about 5 to 30 percent by weight of the composition of a rubbery interpolymer consisting of (1) from about 70 to 95 percent by weight of at least one alkyl ester of acrylic acid containing from 4 to 8 carbon atoms in the alkyl constituent and (2) from about 5 to 30 percent by weight of at least one monomer selected from the group consisting of a lower alkyl-lower alkenyl ketone and a lower alkyl alkacrylate.

2. The composition as claimed in claim 1, wherein said normally crystalline polymer is a copolymer of vinylidene chloride and vinyl chloride.

3. The composition as claimed in claim 2, wherein said normally crystalline polymer is a copolymer of 73 percent by weight of vinylidene chloride and 27 percent by weight of vinyl chloride.

4. The composition as claimed in claim 1, wherein said rubbery interpolymer is composed of (1) butyl acrylate, and (2) methyl isopropenyl ketone.

5. The composition as claimed in claim 1, wherein said rubbery interpolymer is composed of (1) butyl acrylate and (2) methyl methacrylate.

6. The composition as claimed in claim 1, wherein said

*Table*

| Run No. | Rubbery interpolymeric latex | | | | | Vinylidene chloride rubbery interpolymeric latex blend—percent rubbery interpolymer in blend | Properties of oriented film | |
|---|---|---|---|---|---|---|---|---|
| | Alkyl acrylate | | Methyl methacrylate, percent | Methyl isopropenyl ketone, percent | Mooney visc. | | Clarity | Cold flex −18° C. |
| | Kind | Percent | | | | | | |
| *For comparison* | | | | | | | | |
| 1 | | | | | | None | Good | 1 |
| 2 | Butyl acrylate | 100 | | | 5–10 | 15 | Poor | 1 |
| 3 | Butyl methacrylate | 80 | 20 | | 5–10 | 12 | Fair | 1 |
| 4 | Butyl acrylate and Ethyl acrylate | 80 / 20 | | | 5–10 | 12 | Fair | 1 |
| *This invention* | | | | | | | | |
| 5 | Butyl acrylate | 95 | | 5 | 16.2 | 15 | Good | 7 |
| 6 | Butyl acrylate | 80 | | 20 | 19 | 15 | Fair | 5 |
| 7 | Butyl acrylate | 70 | | 30 | 34.3 | 15 | Fair-poor | 5 |
| 8 | Butyl acrylate | 70 | 30 | | | 15 | Good | 2 |
| 9 | Butyl acrylate | 95 | 5 | | 37.8 | 15 | Good | 2 |
| 10 | 2-ethylhexyl acrylate | 80 | 20 | | 5–10 | 7.5 | Good | 2 |

From the above data it can be seen that incorporation of the rubbery interpolymer, as described herein, into normally crystalline vinylidene chloride polymers produces most favorable films and other articles for low temperature utility. It has further been found that the rubbery interpolymer is composed of (1) 2-ethylhexyl acrylate and (2) methyl methacrylate.

7. The composition as claimed in claim 1, containing from 2 to 10 percent by weight of the composition of a plasticizer for a crystalline vinylidene chloride polymer.

8. The composition as claimed in claim 7, wherein said plasticizer is dibutyl sebacate.

9. A polymeric composition comprising a blend of (I) 85 percent by weight of the composition of a normally crystalline polymer consisting of (a) 73 percent by weight of vinylidene chloride and (b) 27 percent by weight of vinyl chloride and (II) 15 percent by weight of the composition of a rubbery interpolymer consisting of (1) from 70 to 95 percent by weight of butyl acrylate and (2) from 5 to 30 percent by weight of methyl isopropenyl ketone.

10. The polymeric composition comprising a blend of (I) 85 percent by weight of the composition of a normally crystalline polymer consisting of (a) 73 percent by weight of vinylidene chloride and (b) 27 percent by weight of vinyl chloride and (II) 15 percent by weight of the composition of a rubbery interpolymer consisting of (1) between 70 and 95 percent by weight of butyl acrylate and (2) between 5 and 30 percent by weight of methyl methacrylate.

11. The polymeric composition comprising a blend of (I) 92.5 percent by weight of the composition of a normally crystalline polymer consisting of (a) 73 percent by weight of vinylidene chloride and (b) 27 percent by weight of vinyl chloride and (II) 7.5 percent by weight of the composition of a rubbery interpolymer consisting of (1) 80 percent by weight of 2-ethylhexyl acrylate and (2) 20 percent by weight of methyl methacrylate.

12. An oriented film having improved flexibility at temperatures below 32° F. composed of a homogeneous blend of (I) about 85 percent by weight of the film of a normally crystalline polymer consisting of (a) 73 percent by weight of vinylidene chloride and (b) 27 percent by weight vinyl chloride and (II) about 15 percent by weight of the composition of a rubbery interpolymer consisting of (1) from about 70 to 95 percent by weight of at least one alkyl ester of acrylic acid containing from 4 to 8 carbon atoms in the alkyl constituent and (2) from about 5 to 30 percent by weight of at least one monomer selected from the group consisting of a lower alkyl-lower alkenyl ketone and a lower alkyl alkacrylate.

13. An oriented film having improved flexibility at temperatures below 32° F. composed of a homogeneous blend of (I) about 85 percent by weight of the film of a normally crystalline polymer consisting of (a) 73 percent by weight of vinylidene chloride and (b) 27 percent by weight of vinyl chloride and (II) about 15 percent by weight of the film of a rubbery interpolymer consisting of (1) between 70 and 95 percent by weight of butyl acrylate and (2) between 5 and 30 percent of methyl isopropenyl ketone.

14. An oriented film having improved flexibility at temperatures below 32° F. composed of a homogeneous blend of (I) about 85 percent by weight of the film of a normally crystalline polymer consisting of (a) 73 percent by weight of vinylidene chloride and (b) 27 percent by weight vinyl chloride and (II) about 15 percent by weight of the film of a rubbery interpolymer consisting of (1) between 70 and 95 percent by weight of butyl acrylate and (2) between 5 and 30 percent by weight of methyl methacrylate.

15. An oriented film having improved flexibility at temperatures below 32° F. composed of a homogeneous blend of (I) 92.5 percent by weight of the film of a normally crystalline polymer consisting of (a) 73 percent by weight of vinylidene chloride and (b) 27 percent by weight vinyl chloride and (II) 7.5 percent by weight of the film of a rubbery interpolymer consisting of (1) 80 percent by weight of 2-ethylhexyl acrylate and (2) 20 percent by weight of methyl methacrylate.

References Cited by the Examiner

UNITED STATES PATENTS

| 2,646,417 | 7/53 | Jennings | 260—31.8 |
| 3,084,065 | 4/63 | Bach | 260—45.5 |

OTHER REFERENCES

Buttrey, Plasticizers, Franklin Publishing Co., New Jersey, Chapt. 4, page 76, 1960.

MORRIS LIEBMAN, *Primary Examiner.*

ALEXANDER H. BRODMERKEL, *Examiner.*